United States Patent [19]
Arnold

[11] Patent Number: 4,777,786
[45] Date of Patent: Oct. 18, 1988

[54] GRASS COLLECTION SYSTEM FOR MOWER

[75] Inventor: William T. Arnold, Sutton West, Canada

[73] Assignee: Brouwer Turf Equipment Limited, Keswick, Canada

[21] Appl. No.: 42,076

[22] Filed: Apr. 24, 1987

[30] Foreign Application Priority Data

Apr. 30, 1986 [CA] Canada ................................. 508007

[51] Int. Cl.⁴ ............................................. A01D 34/48
[52] U.S. Cl. ......................................... 56/199; 56/202; 56/16.6; 56/7
[58] Field of Search ............... 56/6, 7, 16.6, 198, 56/199, 202, 249, 156, 13.3, 12.8, 30, 200

[56] References Cited

U.S. PATENT DOCUMENTS

| | | | |
|---|---|---|---|
| 2,057,417 | 10/1936 | Clapper | 56/199 |
| 2,663,985 | 12/1953 | Hinson | 56/16.6 |
| 3,242,658 | 3/1966 | Morales | 56/202 |
| 3,863,428 | 2/1975 | Baxter | 56/30 |
| 4,021,996 | 5/1977 | Bartlett | 56/7 |
| 4,191,007 | 4/1980 | Cheek et al. | 56/199 |
| 4,199,923 | 4/1980 | Blake | 56/16.6 |
| 4,660,359 | 4/1987 | Deutsch | 56/30 |

*Primary Examiner*—John Weiss
*Attorney, Agent, or Firm*—Rogers, Bereskin & Parr

[57] ABSTRACT

A grass collection system for a reel mower in which an auger extends across each reel. The part of the auger not facing the reel is enclosed by a shield, so the auger conveys cut grass laterally to one end of the mower, from which end the cut grass is conveyed through an air duct and impeller to a hopper. Where the duct connects to the auger shield, an extra opening is provided to entrain outside air, to maintain the flow of air past the auger shield outlet and thus reduce the likelihood of clogging.

27 Claims, 4 Drawing Sheets

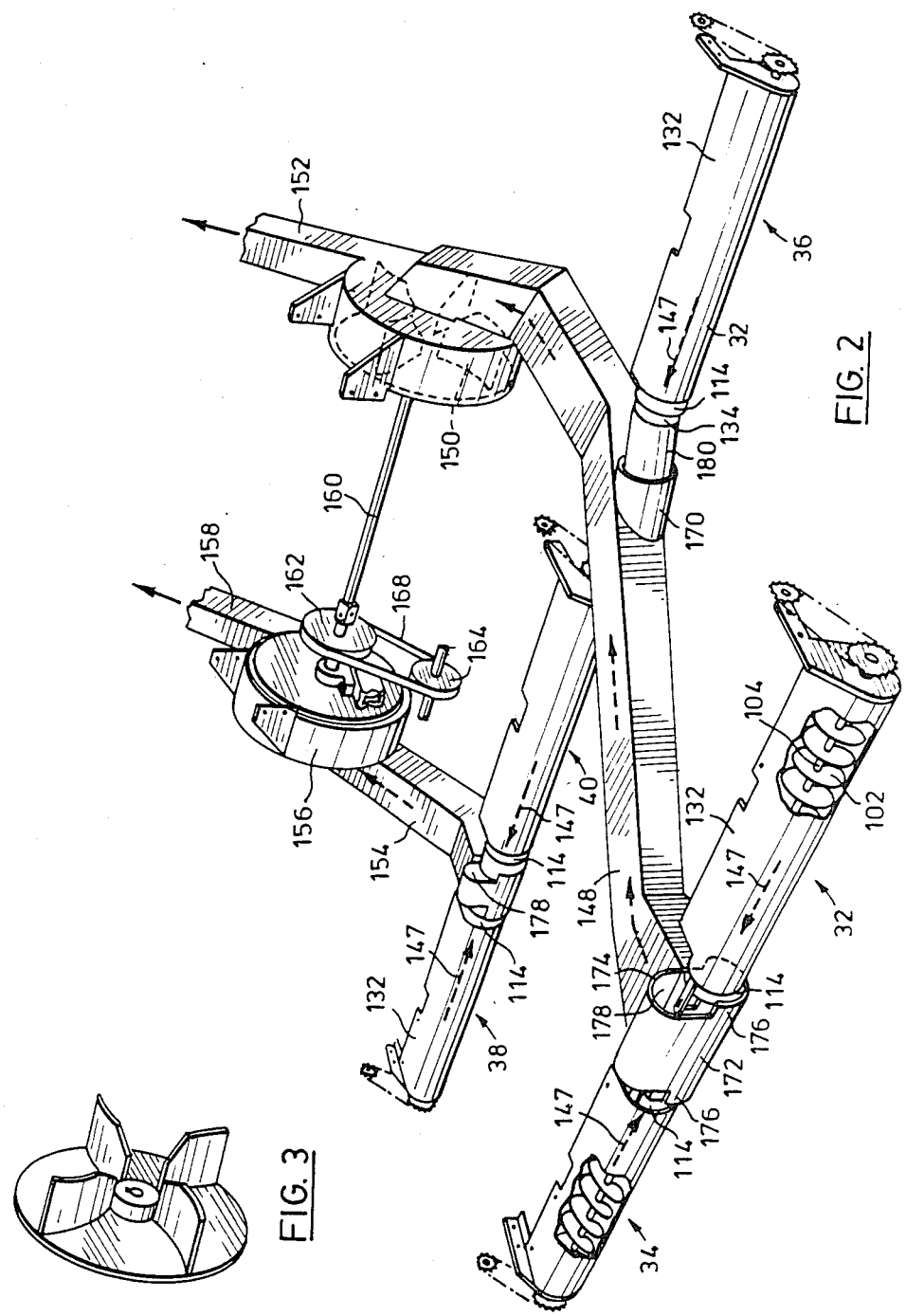

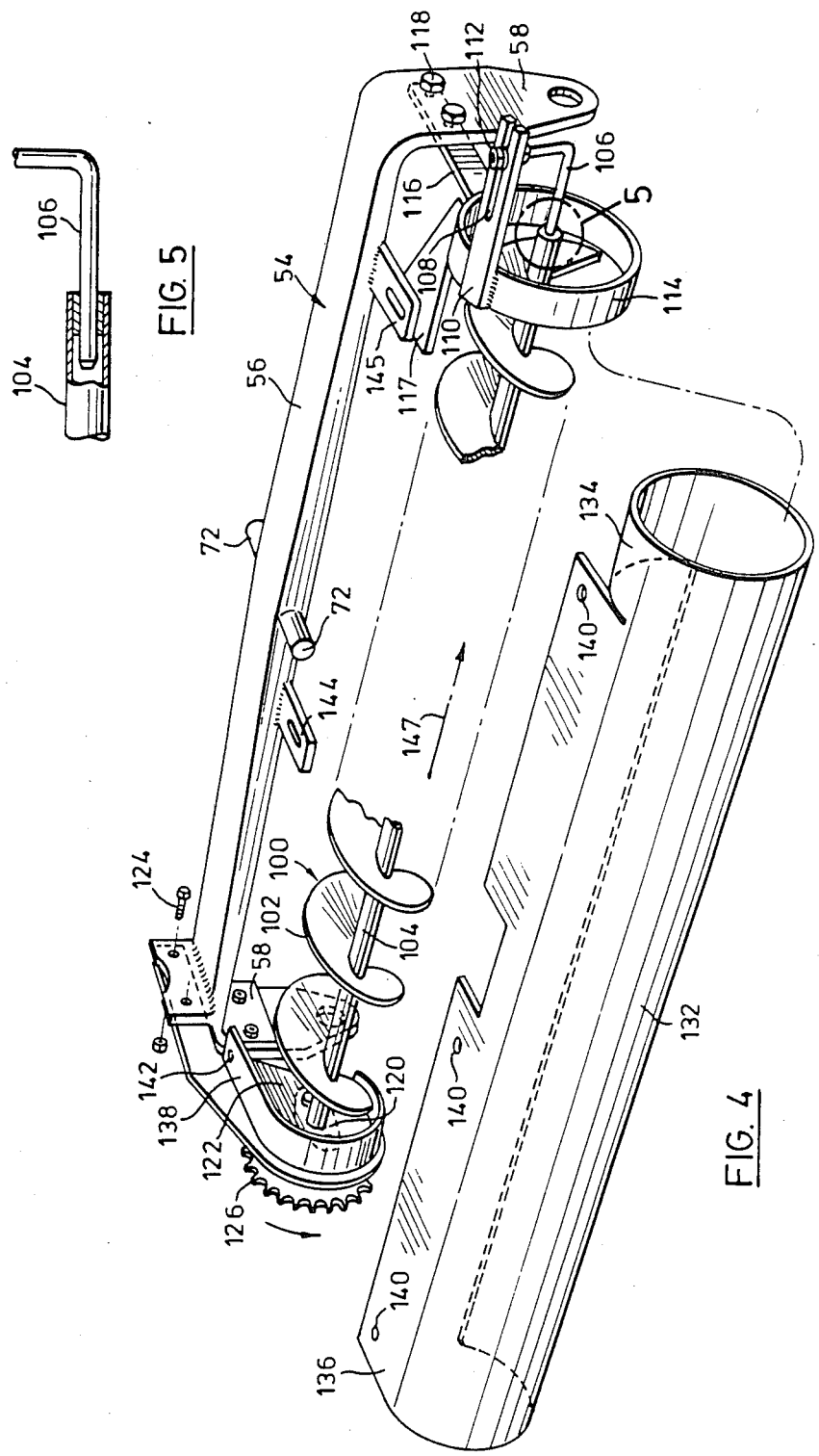

4,777,786

GRASS COLLECTION SYSTEM FOR MOWER

FIELD OF THE INVENTION

This invention relates to improved means in a reel mower for picking up cut grass.

BACKGROUND OF THE INVENTION

Reel mowers are commonly used for cutting grass where an accurate cut and a fine finished appearance for the cut grass are required, e.g. on golf courses. In such areas it is common to pick up the clippings in order to improve the aesthetic appearance of the cut area and to prevent accumulation of thatch in the grass. Where the reel mower has a number of gangs (i.e. separate reel mowers attached to a single vehicle), it is not usually practical to attach a separate pickup basket to each gang. Therefore at the present time clippings are commonly picked up by providing a separate vehicle, fitted either with a sweeper or a vacuum, which travels over the grass area after it has been cut and picks up the clippings. Such clean up vehicles are expensive and the separate clean up operation is time consuming and costly.

SUMMARY OF THE INVENTION

Therefore it is an object of the present invention to provide an arrangement for picking up cut grass, in which a mechanism is fitted to the reel mower itself to pick up the clippings efficiently and without the need for a separate clean up operation after the cutting operation.

In one of its aspects the present invention provides reel mower grass collection apparatus comprising:
  (a) a reel mounted for rotary grass cutting movement,
  (b) mechanical conveying means extending across said reel and facing said reel in a position to receive cut grass therefrom,
  (c) a shield enclosing a portion of said conveying means to retain cut grass within said shield,
  (d) and means for operating said mechanical conveying means to feed cut grass clippings across said reel.

In another of its aspects the present invention provides reel mower apparatus as above recited, and further including air duct means coupled to said shield for receiving clippings from said mechanical conveying means, and means for generating an airstream in said air duct means to convey away said grass clippings delivered to said air duct means by said mechanical conveying means and wherein said air duct means is coupled to said shield at a collection location, said mechanical conveying means including means for feeding cut grass clippings across said reel into said air duct means at said collection location, said air duct means including an air feed opening therein adjacent said collection location to allow outside air to enter said air duct means adjacent said collection location, to help ensure a continually flowing airstream through said air duct means past said collection location and thereby to help ensure that should said mechanical conveying means become filled with grass clippings preventing an airflow therethrough, said clippings will none-the-less tend always to be dumped by said mechanical conveying means into said continually flowing airstream.

Further objects and advantages of the invention will appear from the following description, taken together with the accompanying drawings.

BRIEF DESCRIPTION OF THE DRAWINGS

In the attached drawings:

FIG. 2 is a perspective view showing the cut grass pickup means for the vehicle of FIG. 1;

FIG. 3 is a perspective view of a blower of the FIG. 2 mechanism;

FIG. 4 is a perspective exploded view of a mower support, auger and auger shield for the mechanism of FIGS. 1 to 3;

FIG. 5 is a front view, partly in section, of the auger support shaft arrangement shown in FIG. 4;

DESCRIPTION OF PREFERRED EMBODIMENT

Figure 1:
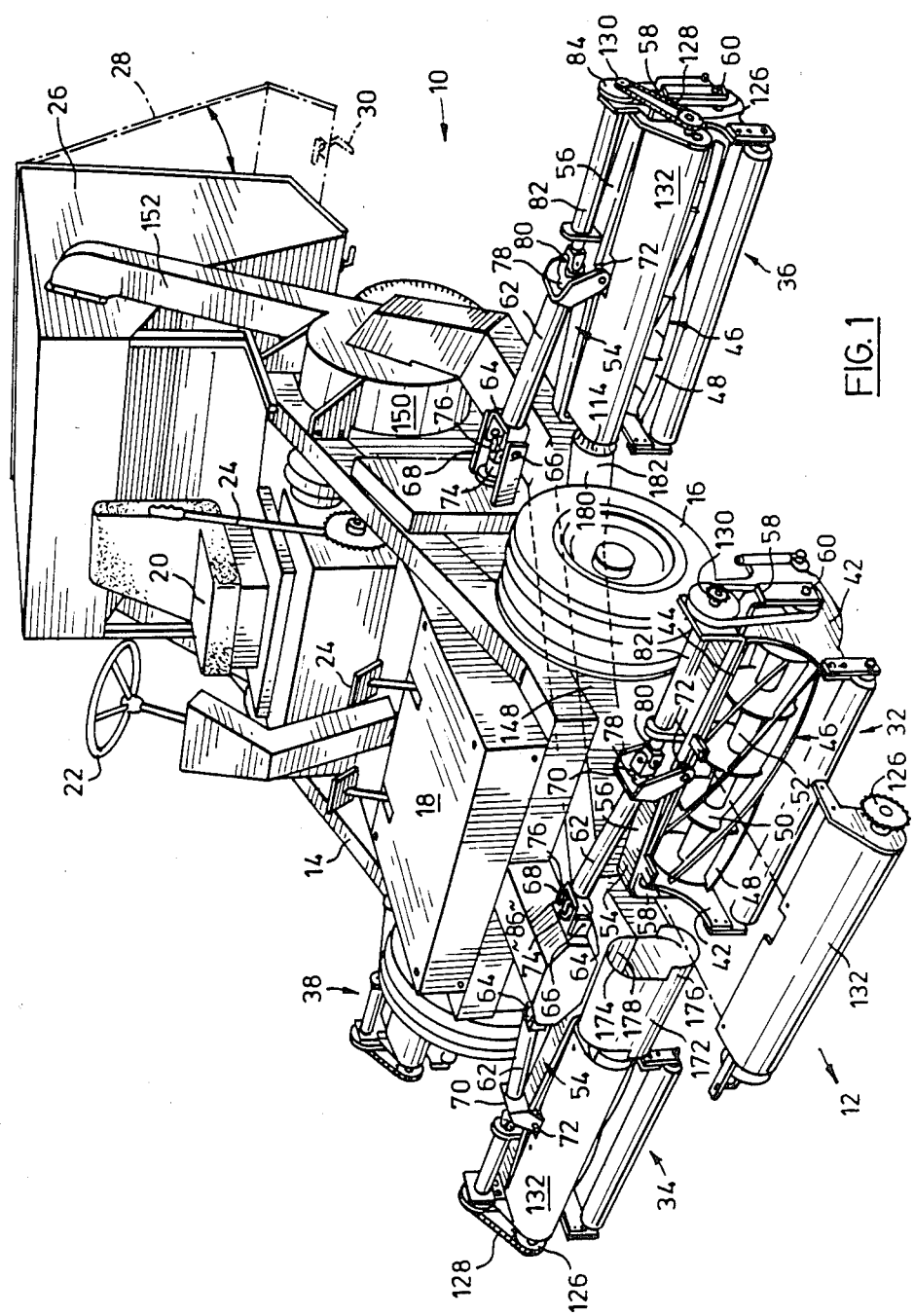
FIG. 1 is a perspective view of a vehicle with a number of separate reel mowers or gangs attached thereto.

Reference is first made to FIG. 1, which shows a vehicle generally indicated at 10 which is adapted to travel forwardly in the direction of arrow 12. The vehicle 10 includes a frame 14, four support and drive wheels 16, and a motor (not shown) beneath an operator seat 20. The vehicle 10 also has a steering wheel 22, and controls diagrammatically indicated at 24. It also includes a large cut grass storage hopper 26 having a rear emptying door 28 which is normally closed by a latch 30. A mechanical or hydraulic mechanism can be provided to open the door 28 when desired.

The vehicle 10 supports two front gangs or reel mowers 32, 34 and three rear gangs or reel mowers 36, 38, 40 of which only two are shown in FIG. 1. Portions of all three rear reel mowers 36, 38, 40 are indicated in FIG. 2.

Each reel mower 32 to 40 is preferably of the construction shown in my co-pending Canadian patent application Ser. No. 437,066 filed Sept. 20, 1983, and the description of that application is hereby incorporated by reference. As shown for mower 32 in FIG. 1, each reel mower 32 to 40 includes a frame having a pair of end plates 42 and a top plate 44 extending between the end plates over the top of the mower. Each mower 32 to 40 includes a reel 46 having spiral blades 48 and support disks 50 mounted on a reel tube 52. The reel tube 52 is rotatably mounted on an inner reel shaft 53 (FIG. 6) which is secured to the mower frame end plates 42. The mower frame end plates 42 are supported by a U-shaped bracket 54 having an upper section 56 which extends over the top of the mower, and downwardly depending ends 58 which are pivotally connected at 60 to the ends of the reel shaft (not shown) which extend through the reel tube 52. Thus the mower can pivot slightly or float on the bracket 54.

Each mower is supported by a tubular arm 62 having an inner forked end 64 which is pivotally connected at 66 to plates 68 projecting from the vehicle 10. The tubular arm 62 has a forked outer end 70 which is connected to stub shafts 72 on the arm 56. This allows each arm 56, with its attached mower, to be pivoted about connection 66 and hence raised at its outboard end (by a piston and cylinder, not shown) during travel of the vehicle from one mowing location to another. It also allows each mower to pivot from side to side about a fore and aft axis through stub shafts 72 (the stub shafts 72 are normally located at approximately the lateral center of gravity of the mower).

Each mower is driven by a drive shaft 74 which extends from the vehicle to a universal joint 76. The universal joint 76 is connected to a second telescopic drive shaft 78 which extends through the tubular arm 62. The second drive shaft 78 is connected by a further universal joint 80 to an outer drive shaft 82 which extends across the top of the mower and carries at its outer end a pulley 84 which drives each reel. The arrangement so far described is all shown and described in my above identified co-pending application.

The front mowers 32, 34 are driven through a common shaft inside housing 86 on the vehicle 10. The rear mowers are driven by other power outputs on the vehicle 10.

Figure 6:
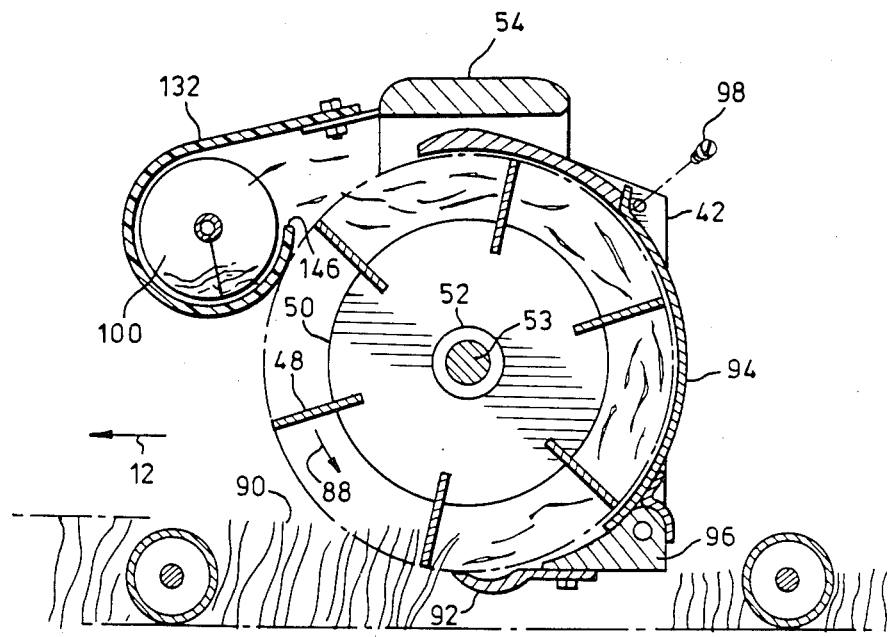
FIG. 6 is a simplified sectional view through one of the mowers of the FIG. 1 arrangement, showing the auger shield and auger detail.

As shown in FIG. 6, when the vehicle 10 moves forwardly in the direction indicated by arrow 12, the reel turns in the direction indicated by arrow 88, cutting the grass 90 against a bed knife 92. A curved rear shield 94 extends across the width of the mower and rests at its bottom on the support 96 for the bed knife. The shield 94 is secured at its top by a pair of screws 98 which protrude one into each mower end plate 42. The rear shield 94 prevents grass clippings from exiting from the rear of the mower and causes the clippings to be carried upwardly and forwardly to a front grass collection means, now to be described.

The grass collection means for each mower includes an auger 100 extending laterally across the width of each mower. Each auger 100 includes a conventional spiral flight 102 mounted on an auger shaft 104. The auger shaft 104 is supported at one end (see FIGS. 4 and 5) by an L-shaped support shaft 106 the outer end of which protrudes through slot 108 in support bar 110 and is held in place by nut 112. The support bar 110 is welded to a ring 114 which in turn is welded to a pair of brackets 116, 117. Bracket 116 is bolted by bolts 118 to the U-shaped mower support bracket 54.

The other end of the auger 100 is supported by a bearing 120 mounted in an end plate 122 which is bolted to the U-shaped bracket 54 by bolts 124. The auger 100 is driven by a sprocket 126 located on the outside of end plate 122. Sprocket 126 is connected by a chain 128 to another sprocket 130 on the end of the mower outer drive shaft 82.

The portion of the auger 100 which does not face the reel 46 is enclosed by a shield 132. One end 134 of shield 132 fits within ring 114; the other end 136 of the shield 132 fits over a corresponding partial ring 138 at the other end of the auger. The shield 132 is held in place by screws (not shown) which extend through holes 140 in the shield 132 and through a hole 142 in the partial ring 138, and also through holes in fastening brackets 144, 145 which extend frontwardly from the mower U-shaped support bracket 54. The bracket 145 also supports plate 117. Thus, as best shown in FIG. 6, each shield 132 extends forwardly and downwardly around its associated auger 100 and then extends upwardly, ending in a lip 146 which is preferably just above a horizontal diameter through the auger 100.

Each auger 100 is shaped so that when it rotates, it delivers cut grass from the closed end of the auger shield 132 (i.e. from end plate 122) to the open end at ring 114 (as indicated by arrow 147 in FIG. 4). The reel 46 of each mower is also preferably shaped (i.e. the twist of its spiral blades 48 is arranged) so that it tends to deliver grass towards the same direction as the auger 100. For example, with reference to FIG. 1, the auger (not shown) in shield 132 of mower 32 will deliver cut grass from right to left as drawn, and the reel 46 therein is rotated in the direction of arrow 88 to move the grass flow towards the same direction. This requires the reels on each side of the mower to be of opposite hands.

The cut grass delivered by each auger 100 is removed from the open end of each auger by an air conveyor system now to be described. As best shown in FIG. 2, the air conveyor system comprises a duct 148 which extends from between the two auger shields 132 in front mowers 32, 34 rearwardly to an impeller 150. From the impeller 150 a second duct 152 extends rearwardly into the storage container 26. Another duct 154 extends from between the two auger shields 132 of the rear mowers 38, 40 rearwardly to a second impeller 156. From impeller 156 another duct 158 extends to the storage container 26. The two impellers 150, 156 are mounted on a common shaft 160 driven by pulleys 162, 164 and a belt 168. The pulley 164 is connected to the main drive train (not shown) of the vehicle 10. A third duct 170 branches from the duct 148 into the open end of the shield 132 of mower 38, to convey cut grass from that mower.

The duct 148 at its front end terminates in a transverse duct section 172 which is of elliptical cross section, with its major axis extending vertically. The top portion of the duct section 172 is inset at each end thereof, as shown at 174, leaving a protruding bottom half-trough 176 section at each end. Each bottom half-trough section 176 extends beneath the corresponding ring 114 at the open end of the auger shield 132, with some clearance between them. This allows each mower to be pivoted upwardly at its outer end for storage when the vehicle is moving from one location to another without mowing. It also allows each mower to float up and down over ground undulations while mowing. The upper portion of each duct section 172 extends above the ring 114, providing an air feed opening 178 for outside air to be drawn into the duct section 172 in addition to the air which travels from the reel into the auger shield 132 and along the auger shield. The additional air which is entrained in this manner has been found to be extremely useful in preventing clippings from accumulating at the exit end of each auger shield 132 and clogging the exit end of each auger. The openings 178, by allowing entrainment of additional air, maintain a sufficient velocity of air at the open end of each auger shield 132 to reduce substantially the likelihood of such clogging. In addition, the openings 178 allow the operator of the machine to view the exit ends of the augers 100 to see whether clogging has occurred.

In addition, each auger shield 132 is of diameter somewhat larger than of the auger 100 within it. For example augers of 3" diameter have been tested in a shield whose inner diameter is 4", thereby allowing a reasonably substantial airflow through each auger shield to augment the action of the auger.

The same transverse duct section described for duct 148 is used for duct 154 which connects the auger shields 132 of the paired rear mowers in FIG. 2, and the same reference numerals have been used therefor. However for the auger shield 132 of mower 36, it is found that an opening to allow entrainment of additional air is less important, because the stream of airflowing rapidly past the open end of duct 170 provides sufficient velocity (essentially a venturi effect) at the open end of its associated auger shield 132 to entrain clippings therefrom.

For auger shield 132 of mower 36, the duct 170 is connected to the ring 114 by a short duct section 180 which loosely extends over the end 134 of the shield 132 and is held in place by two opposed pins 182 (of which only one is shown). The two pins 182 have a horizontal axis. The end 134 will normally be almost fully received in duct section 180. Duct section 180 also extends into duct 170 with a loose fit. This allows the mower 38 to pivot upwardly at its outer end for storage and travel. If desired a strong flexible connecting duct could alternatively be used in place of duct section 180.

It will be appreciated that the arrangement shown can be used in a case of only a single reel mower or gang, or it can be used with multiple gangs as shown. Where it is used with multiple mowers, the mowers are preferably arranged in pairs, with their reels axially aligned when in cutting position (as for the reels of front mowers 32, 34 of FIG. 1). This allows a common air duct to remove clippings from two mowers, thus reducing cost and complexity. In addition the dual auger-air arrangement shown allows movement of the mowers during mowing, and pivoting of the mowers for transport, in a simple manner and without having to disconnect any parts.

The above described arrangement will under normal conditions convey clippings of between $\frac{1}{2}''$ and $\frac{3}{4}''$ in length. This is sufficient for most golf courses, which are cut frequently. If the clippings become longer, particularly when they are wet, then clogging may become a more frequent problem, although the system described performs much better under wet conditions than does a pure vacuum system. (A pure vacuum system can usually function only in dry grass.)

The clogging which may occur with long wet grass can be reduced by removing the support bar 106 at the exit ends of the augers. The longer clippings act as a lubricant to prevent the auger from wearing out the shield, and in fact they tend to support the auger clear of the shield. Since most clogging occurs at the support bar 106, removal of such bar allows even long wet clippings to be handled with reduced likelihood of clogging. However for short clippings, the flow of grass clippings does not provide adequate lubrication and the support bar 106 is then used.

In some applications, e.g. areas which have been recently seeded, it may be preferred not to collect the clippings, since the clippings help to hold moisture and protect the seeds and seedlings. However the clippings if not collected often tend to accumulate on the mower and fall off in clumps. This is unsightly, and the clumps can damage or kill the seedlings. Therefore, if desired, instead of collecting the clippings in storage hopper 26, a horn-shaped outlet can be fitted on the impellers or blowers 150, 156 and the clippings can be blown uniformly over the cut field.

Although augers have been described, other mechanical conveying means can be used, extending across the reels. For example a chain with paddles, or a small conveyor, could be used. However an auger is preferred because of its low cost, simplicity, and minimum maintenance needs.

If desired, an auger with a herringbone spiral twist can be used, to deliver clippings to the center rather than to one end of the shield 132. In that case each reel 46 should also have a herringbone twist, so that the airflow produced by the reel will aid in conveying the clippings to the center collection point. However collection at one end is somewhat simpler and cheaper.

Although the auger drive has been shown as taken off the reel, a separate mechanical or hydraulic drive can be provided for the augers, so that if desired they can be shut off while the reels are running.

In wet cutting conditions with long grass the air feed opening described is particularly useful because under those conditions, the augers can fill with grass. If this occurs, the air supply for the blowers, if it came only through the augers, would be cut off, and the clippings would rapidly build up and clog at the shield outlets. When there is an extra air feed opening at the location where the shields deliver clippings into the air duct, clogging is much less likely to occur because the clippings are then always dumped into a moving airstream. Moreover, the auger cleans the wet clippings off the shield and breaks them up as it delivers them into the continually flowing airstream, again helping to reduce clogging.

As previously noted, where one shield joins the air duct downstream of another, no air feed opening is normally provided at the downstream location since there is already a guaranteed airflow past that location, provided by the air feed opening at the upstream location. (An "upstream" location is one which is farther from the blower than the "downstream" location.)

I claim:
1. Reel mower grass collection apparatus comprising:
    (a) a reel mounted for rotary grass cutting movement,
    (b) mechanical conveying means extending across the entire width of said reel and facing said reel in a position immediately adjacent said reel to receive cut grass therefrom,
    (c) a shield enclosing a portion of said conveying means across the entire width of said reel to retain cut grass within said shield,
    (d) means for operating said mechanical conveying means to feed cut grass clippings across said reel to one end of said shield,
    (e) air duct means coupled to said shield at said one end for receiving clippings from said mechanical conveying means,
    (f) said mechanical conveying means including means for feeding cut grass clippings across said reel into said air duct means at said one end,
    (g) means for generating an airstream in said air duct means to convey away said grass clippings delivered to said air duct means by said mechanical conveying means,
    (h) said air duct means including an air feed opening therein adjacent said one end to allow outside air to enter said air duct means adjacent said one end, to help ensure a continually flowing airstream through said air duct means past said one end and thereby to help ensure that should said mechanical conveying means become filled with grass clippings preventing airflow therethrough, said clippings will none-the-less tend always to be dumped by said mechanical conveying means into said continually flowing airstream.
2. Apparatus according to claim 1 wherein said mechanical conveying means is an auger.
3. Apparatus according to claim 1 wherein said reel has a plurality of spiral blades, said apparatus having means for rotating said reel, said spiral blades having their spiral twist oriented to tend to deliver cut grass toward the same direction as said auger.

4. Apparatus according to claim 1 and comprising two reel mowers each having a said mechanical conveying means and shield, and wherein said air duct means is coupled to both said shields.

5. Apparatus according to claim 4 wherein the ends of said shields are located in spaced apart opposed relationship, said air duct means being coupled to one of said shields at one said collection location and to the other of said shields at a second said collection location, said air duct means having a said air feed opening at each of said collection locations to allow outside air to enter said air duct means at each of said collection locations.

6. Apparatus according to claim 4 wherein the ends of said shields are connected to said air duct means at first and second collection locations, said second collection location being spaced downstream along said air collection means from said first collection location, said air duct means having a said air feed opening at said first collection location but not at said second collection location.

7. Apparatus according to claim 2 wherein said auger has a spiral twist to feed said clippings toward one end of said shield, said shield having a discharge opening of a first predetermined area at said collection location to feed said clippings into said air duct means, said air duct means having an opening of a second predetermined area to receive said clippings, said second predetermined area being larger than said first predetermined area and the difference therebetween constituting said air feed opening.

8. Apparatus according to claim 2 and comprising two said reel mowers each having a said auger and shield, each said auger having a spiral twist to deliver cut grass clippings to one end of its associated shield, said one ends of said shields being located in spaced apart opposed relationship, air duct means coupled to said one end of each shield for receiving clippings from said augers, means for generating an airstream in said air duct means to convey away grass clippings delivered to said air duct means by said augers, said air duct means extending between said opposed ends, said air duct means including an air feed opening therein to allow outside air to enter said airstream duct means adjacent said ends of said shields to maintain the flow of air past said ends of said shields, thereby to reduce the likelihood of cut grass clogging said ends of said shields.

9. Apparatus according to claim 1 wherein said shield includes a top portion extending from said reel to a location above said conveying means remote from said reel, an outer side portion covering the side of said conveying means, a bottom portion covering the bottom of said conveying means, and an upwardly extending lip located between said conveying means and said reel and extending from said bottom portion partway up the side of said conveying means, said top portion and said lip defining between them a short passage of minimum length between said reel and said conveying means and said passage being substantially free of surfaces obstructing tangential flow of clippings in a straight line from said reel to said conveying means, to reduce the likelihood of clippings clogging said passage and to prevent clippings from falling out of said shield.

10. Reel mower apparatus comprising:
(a) a vehicle,
(b) a frame mounted on said vehicle,
(c) a reel mounted on said frame for rotary grass cutting movement,
(d) mechanical conveying means mounted on said frame facing said reel and extending across the entire width of said reel in a position immediately adjacent said reel to receive cut grass therefrom,
(e) a shield enclosing a portion of said mechanical conveying means across the entire width of said reel to retain cut grass within said shield,
(f) means for operating said mechanical conveying means to feed grass clippings across said reel to one end of said shield,
(g) grass storage means,
(h) air duct means coupled between said one end of said shield and said grass storage means to receive cut grass from said one end of said shield and to carry the same to said grass storage means,
(i) blower means coupled to said air duct means to move air and clippings therethrough from said one end of said shield to said storage means,
(j) said air duct means including an air feed opening adjacent said one end of said shield to entrain outside air in the airstream flowing past said one end of said shield, thereby to maintain the flow of air past said one end of said shield to reduce the likelihood of grass clippings clogging said one end of said shield.

11. Apparatus according to claim 10 wherein said mechanical conveying means is an auger.

12. Apparatus according to claim 11 and comprising two said reel mowers each having a said auger and shield, said air duct means being coupled to both said shields.

13. Apparatus according to claim 12 wherein said air duct means is coupled to said shields at first and second locations which are substantially equidistant from said blower means, said air duct means having a said air feed opening for admission of outside air adjacent each of said first and second locations.

14. Apparatus according to claim 12 wherein said air duct means is coupled to said shields at first and second locations, said second location being further downstream toward said blower means than said first location, said air duct means having said air feed opening for admission of outside air adjacent said first location but not said second location.

15. Apparatus according to claim 11 and including two reel mowers aligned so that said reels in operative cutting position form substantially a straight line and are spaced laterally from each other, each reel mower including a said auger and shield, said one end of one shield being laterally spaced from said one end of the other shield, said air duct means including a duct section extending between said ends.

16. Apparatus according to claim 15 wherein said duct section is of substantially elliptical form, having its major axis oriented in a substantially vertical direction, said major axis being of greater diameter than the opening at said one end of each shield, the upper portion of said duct section being open to atmosphere at each end thereof to form said air feed opening.

17. Apparatus according to claim 10 wherein said shield has at said one end a discharge opening of a first predetermined area to feed clippings into said air duct means, and wherein said air duct means has an opening of a second predetermined area to receive said clippings, said second predetermined area being larger than said first predetermined area and the difference therebetween constituting said air feed opening.

18. Apparatus according to claim 11 wherein said vehicle is adapted to travel forwardly in a cutting direction, and wherein said auger and shield are located at the front of each reel.

19. Apparatus according to claim 11 wherein each reel has a set of spiral blades, the spiral twist of the blades of said reel being oriented to deliver grass in a direction towards said one end of its associated shield.

20. Apparatus according to claim 11 and including drive shaft means for driving said reel, said drive shaft means including a drive shaft extending across the top of said reel and having an end, a pulley extending from said end of drive shaft to said reel, a sprocket at said end of said drive shaft, a further sprocket connected to said auger, and a chain connected between said sprockets to drive said auger, whereby both said auger and said reel are driven from said drive shaft.

21. A mower according to claim 15 wherein each of said mowers is pivotally mounted adjacent said one end of said shield so that the other end of said mower may be moved upwardly for storage during travel of said vehicle.

22. Apparatus according to claim 10 wherein said shield includes a top portion extending from said reel to a location above said conveying means remote from said reel, an outer side portion covering the side of said conveying means, a bottom portion covering the bottom of said conveying means, and an upwardly extending lip located between said conveying means and said reel and extending from said bottom portion partway up the side of said conveying means, said top portion and said lip defining between them a short passage of minimum length between said reel and said conveying means and said passage being substantially free of surfaces obstructing tangential flow of clippings in a straight line from said reel to said conveying means, to reduce the likelihood of clippings clogging said passage and to prevent clippings from falling out of said shield.

23. Reel mower grass collection apparatus comprising:
(a) a reel frame, and means mounting said frame for movement between a lowered grass cutting position and a raised storage position,
(b) a reel mounted on said frame for rotary grass cutting movement,
(c) mechanical conveying means mounted on said frame facing said reel and extending across said reel in a position to receive cut grass therefrom, said mechanical conveying means being located immediately adjacent said reel and being of width substantially equal to that of said reel,
(d) a shield connected to said frame and moveable therewith, said shield enclosing a portion of said conveying means across the entire width of said reel, said shield having a top portion extending from said reel to a location above said conveying means, an outer side portion covering the side of said conveying means remote from said reel, a bottom portion covering the bottom of said conveying means, and an upwardly extending lip located between said conveying means and said reel and extending from said bottom portion partway up the side of said conveying means, said top portion and said lip defining between them a very short passage of minimum length between said reel and said conveying means, said passage being substantially free of surfaces obstructing tangential flow of clippings in a straight line from said reel to said conveying means to reduce the likelihood of clippings clogging said passage and to prevent clippings from falling out of said shield,
(e) and means for operating said conveying means to feed grass clippings across said reel to one end of said reel.

24. Apparatus according to claim 23 wherein said mechanical conveying means is an auger and said lip extends upwardly at least substantially to the level of a horizontal diameter through said auger.

25. Apparatus according to claim 24 wherein said auger is located at the front of said reel and adjacent its top, said apparatus further including a cover covering the rear of said mower to force said clippings to be carried by said reel to said passage for discharge into said auger.

26. Apparatus according to claim 25 and including a vehicle, and at least two said reel mowers each having said frame, said auger and said shield, said frames being individually mounted for movement between said lowered grass cutting position and said raised storage position, said frames being positioned so that said reel mowers are in side-by-side alignment and so that said reels in operative cutting position form a substantially straight line and are spaced laterally from each other and so that each has an inner end facing the inner end of the other reel mower, each said auger being rotatable to deliver clippings toward the inner end of its associated reel, each reel having a spiral twist oriented to tend to deliver cut grass in the same direction as its associated auger.

27. Apparatus according to claim 26 wherein each said frame together with its associated reel mower and shield is pivotally mounted at one end thereof for swinging movement between said lowered grass cutting position and said raised storage position.

* * * * *